(12) United States Patent
Mackin et al.

(10) Patent No.: US 9,738,389 B2
(45) Date of Patent: Aug. 22, 2017

(54) SYSTEMS AND METHODS FOR COOLING USING GALLEY MONUMENTS

(71) Applicant: THE BOEING COMPANY, Chicago, IL (US)

(72) Inventors: Steven George Mackin, Bellevue, WA (US); Francesco Balestra, Seattle, WA (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 14/489,928

(22) Filed: Sep. 18, 2014

(65) Prior Publication Data
US 2016/0084592 A1    Mar. 24, 2016

(51) Int. Cl.
*G05D 23/00*    (2006.01)
*B64D 13/06*    (2006.01)
*B64D 11/04*    (2006.01)

(52) U.S. Cl.
CPC .............. *B64D 13/06* (2013.01); *B64D 11/04* (2013.01); *B64D 2013/0629* (2013.01); *Y02T 50/56* (2013.01)

(58) Field of Classification Search
CPC B64D 13/06; B64D 11/04; B64D 2013/0629; F28F 13/06
USPC ....................................................... 165/287
See application file for complete search history.

(56) References Cited

U.S. PATENT DOCUMENTS

| | | | | |
|---|---|---|---|---|
| 4,262,495 A | * | 4/1981 | Gupta .................... | B64D 13/06 62/172 |
| 5,839,293 A | * | 11/1998 | Teitelbaum ............ | B60H 1/247 454/143 |
| 7,231,778 B2 | | 6/2007 | Rigney et al. | |
| 7,697,292 B2 | | 4/2010 | Uluc et al. | |
| 2003/0042361 A1 | | 3/2003 | Simadiris et al. | |
| 2007/0137234 A1 | * | 6/2007 | Zywiak .................. | B64D 13/06 62/239 |

OTHER PUBLICATIONS

Justin Hale, Dreamliner Technologies and the Evolution of Maintenance, Power Point, Sep. 29, 2010, pp. 1-20, Boeing, USA.
Parker Services, Liquid Cooling Systems, Thermal Management Systems—Product, 2013, https://www.parker.com/portal/site/Market-Tech/menuitem.4f2d948a76574676de92b210237ad1ca/?vgnextoid=6bcfa7bee4a70310VgnVCM10000048021dacRCRD&vgnextfmt=default&viewProducts=yes&categeryid=a617b30c67cb0310VgnVCM10000048021dac, p. 1-4, Parker Hannifin Corporation, USA.

* cited by examiner

*Primary Examiner* — Davis Hwu
(74) *Attorney, Agent, or Firm* — Jay J. Hoette; The Small Patent Law Group, LLC

(57) ABSTRACT

A cooling system for use with a galley monument having at least one galley compartment includes a heat exchanger supplying cooled air to at least one galley compartment. An airflow supply and return system has a supply duct that couples the heat exchanger in flow communication with the at least one galley compartment. A diverter mechanism is positioned at least partially within the supply duct for controlling flow of the cooled air. The diverter mechanism is movable between a first position in which the cooled air flows from the heat exchanger through the supply duct to the at least one galley compartment and a second position in which at least a portion of the cooled air from the heat exchanger is discharged from the supply duct to the passenger compartment of the aircraft.

21 Claims, 4 Drawing Sheets

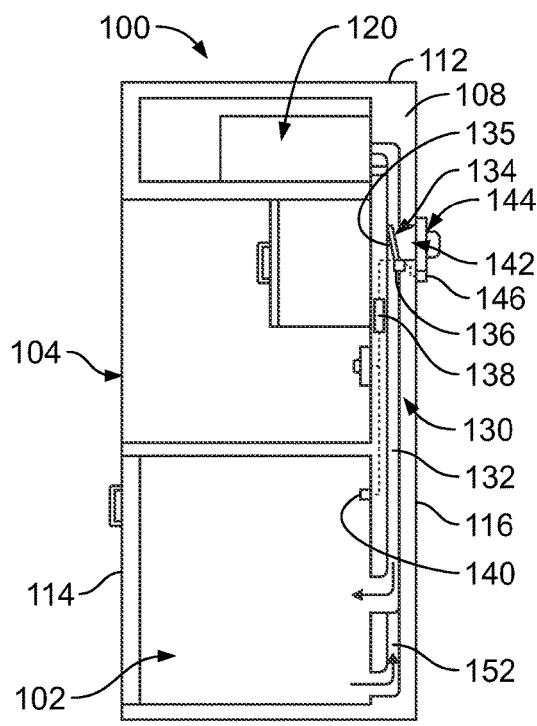
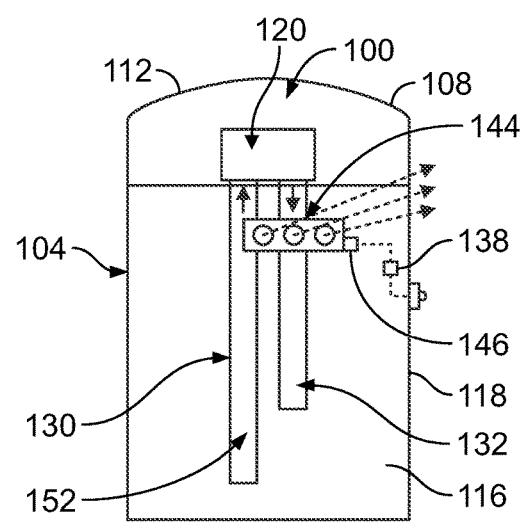
FIG. 4  FIG. 5
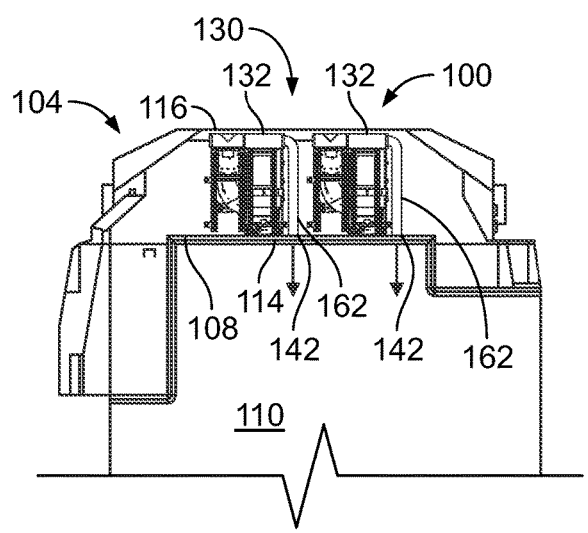
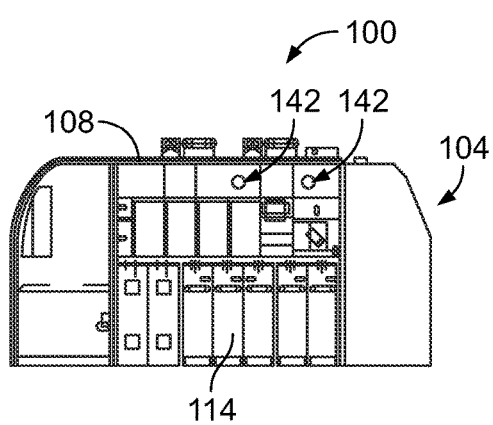
FIG. 6  FIG. 7

SYSTEMS AND METHODS FOR COOLING USING GALLEY MONUMENTS

BACKGROUND

The present disclosure relates generally to systems and methods of cooling using galley monuments and, more particularly, to systems and methods for cooling a passenger compartment or cabin using the galley monument.

On hot days, the passenger compartment of an aircraft on the ground can become uncomfortably warm for passengers and crew. Furthermore, it is desirable for the aircraft to have the lights, in-flight entertainment and other heat loads on, which increases the temperature in the passenger compartment. Cooling capacity of the conventional passenger compartment cooling system can be increased by either increasing power to the system, which negatively impacts fuel efficiency, or by installing larger generators and larger system components, which increases weight and cost of the aircraft.

When the aircraft is on the ground, cool air is pumped into galley compartments of a galley monument, which is used to cool galley carts that hold airline meals. Airline meals are typically prepared in advance by caterers and held in galley carts, which are loaded onto the aircraft prior to takeoff. The galley monument typically includes a plurality of refrigerated compartments or zones, and a heat exchanger is used to supply cooled air to each of the compartments or zones via one or more ducts. The cooled air is not efficiently used in the galley compartments when no galley carts are present. Additionally, when the galley carts are first placed in the galley monument, the galley carts are loaded with dry ice to keep the meals or drinks cold during transport to the aircraft. Such dry ice lasts for a significant period of time after the galley carts are loaded into the galley compartments, which reduces the demand for cooled air in the galley compartments. As such, the cooled air is not efficiently used or unnecessary in some circumstances. Furthermore, the cooled air in the galley compartments is not efficiently used due to leakage from the galley compartments, which are located at the floor level. Any cool air escaping from the galley compartments sinks into the belly of the aircraft and does not efficiently cool the passenger compartment.

SUMMARY

In accordance with one embodiment, a cooling system for use with a galley monument having at least one galley compartment is provided that includes a galley monument housing positioned in a passenger compartment of an aircraft having a galley compartments. A heat exchanger supplies cooled air to the plurality of at least one galley compartments. An airflow supply and return system has a supply duct in the galley monument housing that couples the heat exchanger in flow communication with the at least one galley compartments. A diverter mechanism is positioned at least partially within the supply duct for controlling flow of the cooled air. The diverter mechanism is movable between a first position in which the cooled air flows from the heat exchanger through the supply duct to the at least one plurality of galley compartments and a second position in which at least a portion of the cooled air from the heat exchanger is discharged from the supply duct to the passenger compartment of the aircraft.

In another embodiment, a diverter mechanism is provided for a galley monument cooling system. The diverter mechanism is positioned within a cooled air supply duct of a galley monument. The diverter mechanism includes a flap sized to at least partially restrict airflow through the supply duct and an actuator operably coupled to the flap. The actuator moves the flap between a first position in which the flap allows cooled air to flow through the supply duct to galley compartments of the galley monument and a second position in which at least a portion of the cooled air is diverted from the supply duct and discharged out of the galley monument into a passenger compartment.

In a further embodiment, a method of manufacturing a galley monument cooling system is provided that includes coupling a heat exchanger to a galley monument, coupling a supply duct to a galley monument in flow communication with the heat exchanger, the supply duct being in flow communication with at least one galley compartment of the galley monument, and positioning a diverter mechanism in the supply duct to divert at least a portion of the airflow from the supply duct to an exterior of the galley monument.

In another embodiment, a method of cooling a passenger compartment of an aircraft using a galley monument cooling system is provided that includes providing a supply duct in a galley monument housing for supplying cooling air to a galley compartment of the galley monument, operating a heat exchanger to supply cooled air to the supply duct, and operating a diverter mechanism positioned within the supply duct to divert at least a portion of the cooled air from the supply duct and discharge such cooled air out of the galley monument into the passenger compartment.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 4 is a side view of the galley monument and cooling system in accordance with an exemplary embodiment.

FIG. 5 is a back view of the galley monument and cooling system in accordance with an exemplary embodiment.

FIG. 6 is a front view of the galley monument and cooling system in accordance with an exemplary embodiment.

FIG. 7 is a top view of the galley monument and cooling system in accordance with an exemplary embodiment.

DETAILED DESCRIPTION

Figure 1:
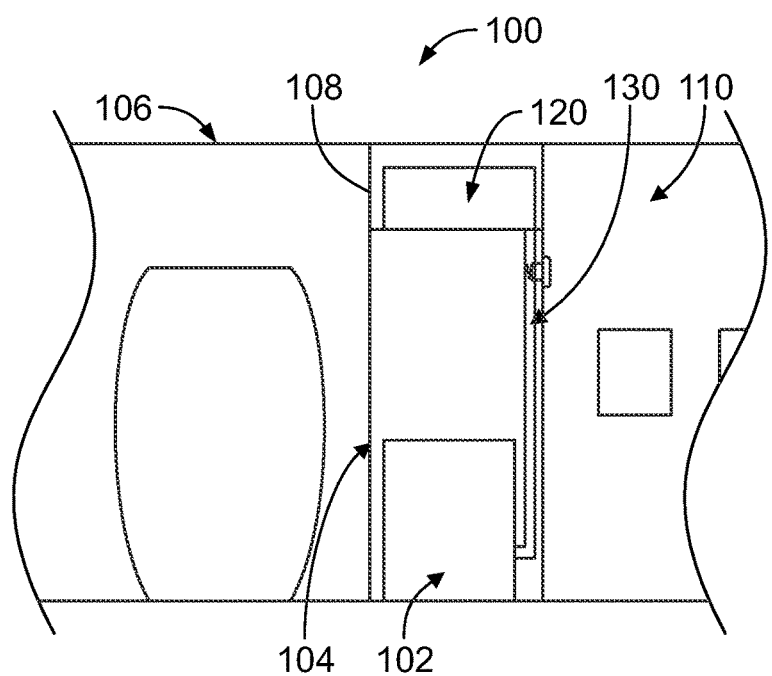
FIG. 1 is a schematic illustration of an exemplary cooling system for a galley monument of an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a cooling system for an aircraft configured to supply cooling air from a galley monument to the passenger cabin or compartment. For example, the network of cooling ducts of the galley monument cooling system includes a least one cooling air supply duct with a vent in the passenger cabin. In various embodiments, a diverter mechanism is used to control the flow of cooling air in the supply duct. For example, when the diverter mechanism is in a first position, the diverter mechanism allows cooled air to flow through the supply duct to the galley compartments of the galley monument and thus cool the galley carts. When the diverter mechanism is in a second position, at least a portion of the cooled air is diverted from the supply duct and is discharged out of the galley monument into a passenger compartment.

FIG. 1 is a schematic illustration of an exemplary cooling system 100. In the illustrated embodiment, the cooling system 100 is described with respect to a galley monument cooling system used to cool galley carts held in galley compartments 102 of a galley monument 104 on an aircraft 106. The galley monument 104 includes a galley monument housing 108 that defines the galley compartments 102. The galley monument housing 108 houses and encloses portions of the cooling system 100. The galley monument housing 108 is positioned within a passenger compartment 110 of the aircraft 106. A portion of the passenger compartment 110 of the aircraft 106 is illustrated without passenger seats for ease of illustration.

The cooling system 100 includes a heat exchanger 120 that provides cooled air. The cooling system 100 also includes an airflow supply and return system 130 that is configured to channel the cooled air supplied by the heat exchanger 120 to various locations within the aircraft 106. The airflow supply and return system 130 is also configured to return heated air from the passenger compartment 110 and/or the galley compartments 102 to the heat exchanger 120 or other suitable location in the aircraft 106. In an exemplary embodiment, in various modes of operation, the airflow supply and return system 130 at times supplies the cooled air to the passenger compartment 110 and at times supplies the cooled air to the galley compartments 102. For example, in a galley compartment cooling mode, the galley monument cooling system 100 is used to supply cooled air to the galley compartments 102, and while in a passenger compartment cooling mode, the galley monument cooling system 100 is used to supply cooled air to the passenger compartment 110. Optionally, the cooling system 100 may include components or mechanisms to divert the cooled air to the passenger compartment 110.

Figure 2:
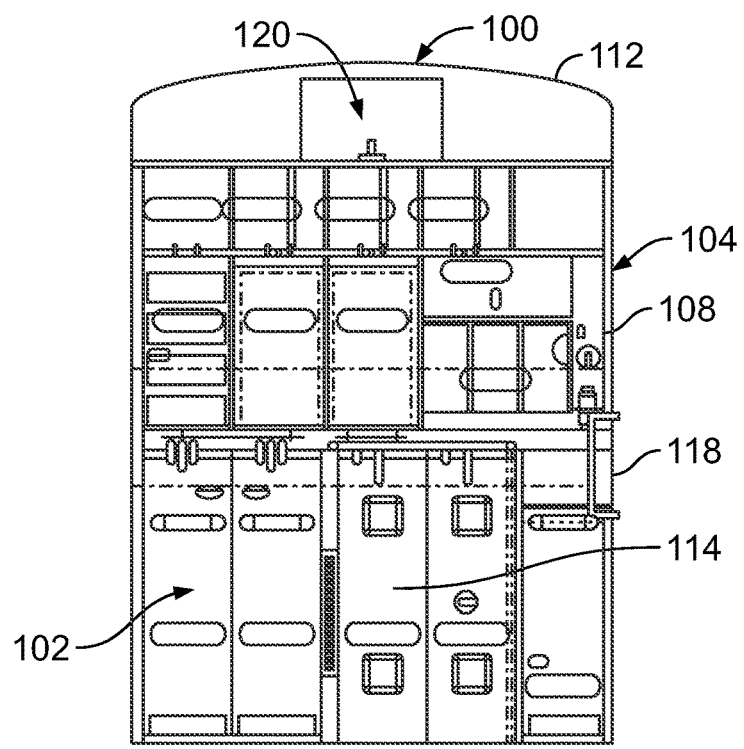
FIG. 2 is a front view of the galley monument and cooling system in accordance with an exemplary embodiment.
Figure 3:
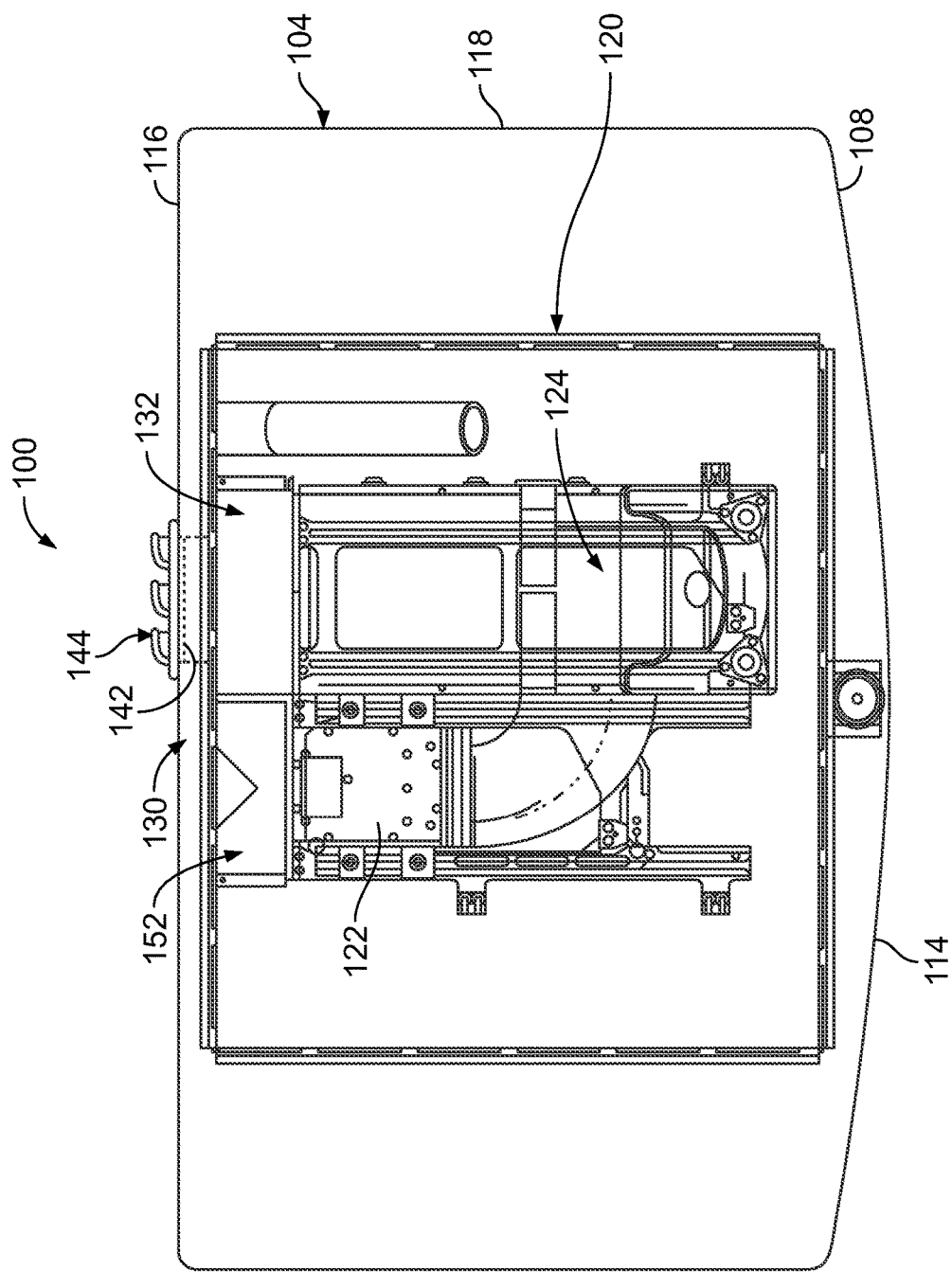
FIG. 3 is a top view of the galley monument and cooling system in accordance with an exemplary embodiment.

FIG. 2 is a front view of the galley monument 104 and cooling system 100 in accordance with an exemplary embodiment. FIG. 3 is a top view of the galley monument 104 and cooling system 100 in accordance with an exemplary embodiment. FIG. 4 is a side view of the galley monument 104 and cooling system 100 in accordance with an exemplary embodiment. FIG. 5 is a back view of the galley monument 104 and cooling system 100 in accordance with an exemplary embodiment.

The galley monument 104 may include any number of galley compartments 102 and the aircraft 106 (shown in FIG. 1) may include any number of galley monuments 104. The passenger compartment 110 (shown in FIG. 1), as used herein, is the area exterior of the galley monument 104 within the aircraft 106 where passengers and crew are able to be located. The galley monuments 104 are typically arranged near the doors of the aircraft 106, such as at the fore and/or aft of the passenger compartment 110, but may be located mid-passenger-compartment in some embodiments. As used herein a galley compartment is an insulated volume that is utilized to store one or more galley carts on the aircraft 106. A galley cart, as used herein, is a portable device that is used to store food and/or beverages that are transported from a caterer to the aircraft 106 or from the galley compartments 102 to other parts of the aircraft 106 for serving the food and/or beverages. The cooling system 100 is configured to supply cooling air to each of the galley compartments 102 when operated in a galley compartment cooling mode to facilitate cooling the galley compartments 102 or to facilitate cooling galley carts positioned in the galley compartments 102.

The galley monument housing 108 includes a top 112, a front 114, a back 116 opposite the front 114, and at least one side 118. The galley compartments 102 have doors at the front 114 and are configured to receive the galley carts through the front 114; however, the doors may be omitted in some embodiments. The back 116, in the illustrated embodiment, generally faces the passenger compartment 110 (e.g., passenger seats are located behind the back 116), however in alternative embodiments, the back 116 may be positioned against a bulkhead. The back 116 may face the fore or the aft of the aircraft 106. The side 118 may be exposed to an aisle where passengers walk through the passenger compartment 110.

In an exemplary embodiment, the heat exchanger 120 is positioned at the top 112. The heat exchanger 120 includes a fan 122 (shown in FIG. 3) used to increase the flow of air through the cooling system 100. The fan 122 directs the air over a galley chilling unit 124 (shown in FIG. 3) used to reduce the temperature of the airflow. In the illustrated embodiment, the fan 122 is positioned in the airflow supply and return system 130, such as between a return duct and a supply duct. The fan 122 may be positioned upstream of the galley chilling unit 124; however, the fan 122 may be positioned at other locations in alternative embodiments.

In normal operation, the cooling system 100 is operated in the galley compartment cooling mode, and the heat exchanger 120 is configured to supply cooled air to the galley compartments 102. However, in a bypass operation, the cooling system 100 is operating in the passenger compartment cooling mode, and the heat exchanger 120 is configured to supply cooled air to the passenger compartment 110.

In one embodiment, the galley chilling unit 124 is a liquid-cooled galley chilling unit that provides chilled liquid, such as a refrigerant, to the heat exchanger 120 to cool the air supply. Heat exchanging of the liquid is performed remote from the heat exchanger 120 and from the galley monument housing 108, such as in the belly of the aircraft 106. Heat generated in such heat exchange is vented from the aircraft 106 and kept out of the passenger compartment 110.

In another embodiment, the galley chilling unit 124 is a conventional refrigeration unit, which includes an evaporator, a condenser, a compressor, and an expansion valve (not shown). In operation, a refrigerant (not shown) is compressed via the compressor. The compressed refrigerant is discharged from compressor as a vapor at a higher temperature. The vapor is channeled through the condenser which condenses the vapor into a liquid by removing the heat acquired from the compartments 102 by the evaporator. The condensed vapor is then channeled through the expansion valve and back to the compressor. Thus, the heat exchanger 120 is configured to remove heat from the compartments 102 thereby cooling or reducing the temperature of the compartments 102. However, the heat removed tends to be dispelled into the crown of the aircraft 106, which may increase the overall temperature in the passenger compartment 110. It should be realized that different type of heat exchangers, such as known in the art, may be used in alternative embodiments.

The airflow supply and return system 130 is arranged within the galley monument housing 108. Components of the airflow supply and return system 130 may be routed in various locations to supply and return the air as needed. In the illustrated embodiment, components of the airflow supply and return system 130 are generally arranged along the back 116 of the galley monument housing 108, such as behind the cabinets, galley compartments 102, and other compartments of the galley monument 104. The airflow supply and return system 130 is configured to channel cooling air supplied by the heat exchanger 120 to the passenger compartment 110 and/or the galley compartments 102. The airflow supply and return system 130 is also configured to return heated air from the passenger compartment 110 and/or the galley compartments 102 to the heat exchanger 120 or other location of the aircraft 106.

The airflow supply and return system 130 includes at least one cooling air supply duct 132 to supply cooled air to the passenger compartment 110 and/or the galley compartments 102. In an exemplary embodiment, the same supply duct(s) 132 are used to supply the cooled airflow to the passenger compartment 110 and to the galley compartments 102. In other various embodiments, dedicated supply ducts 132 are used to supply the cooled air to the passenger compartment 110 and to the galley compartments 102. For example, in such various embodiments, one of the supply ducts 132 defines a dedicated passenger compartment supply duct that diverts the cooled air to the passenger compartment 110 while at least one other supply duct 132 is dedicated to supplying the cooled air to the galley compartments 102. The supply duct(s) 132 are arranged along the back 116. The supply duct(s) 132 extend generally vertically from the top 112 to the galley compartments 102, which are near a bottom of the galley monument 104. The supply duct(s) 132 may extend in any direction or to any location of the galley monument housing 108, such as to the side 118, the front 114, and the like.

In an exemplary embodiment, the galley monument 104 includes at least one vent 142 (shown in FIG. 5) that discharges the cooled air to the passenger compartment 110. The vent 142 is in flow communication with at least one of the supply ducts 132 and receives cooled air from such supply duct(s) 132. The vent 142 may be opened and closed and/or the supply of cooled air may be allowed or restricted depending on the desire for cooling in the passenger compartment 110. Optionally, the vent 142 may be located near the top 112 of the galley monument housing 108, which allows the diverted cooled air to be expelled near the top of the passenger compartment 110. The cool air is allowed to settle to the cabin floor to cool the passenger compartment 110. Additionally, as the passengers walk past the vent 142 and through the cooled airflow, the cooled air is able to circulate through the passenger compartment 110, decreasing the overall temperature of the passenger compartment 110.

In an exemplary embodiment, a diverter mechanism 134 (shown, for example, in FIGS. 4 and 5) is positioned in the cooled air supply duct 132. The diverter mechanism 134 is operated to divert at least a portion of the cooled air from the supply duct 132 and discharge such cooled air out of the galley monument housing 108 through the vent 142 into the passenger compartment 110 when the cooling system 100 is operated in the passenger compartment cooling mode. However, when the cooling system 100 is operated in the galley compartment cooling mode, the cooling system 100 restricts airflow to the vent 142, such as with the diverter mechanism 134. For example, the diverter mechanism 134 may close off the vent 142. The diverter mechanism 134 controls the flow of the cooled air through the airflow supply and return system 130, such as by controlling the flow of the cooled air to the galley compartments 102 or to the passenger compartment 110.

The diverter mechanism 134 is operably coupled to an actuator 136 that actuates or moves the diverter mechanism 134. The diverter mechanism 134 is movable between a first position in which a majority of the cooled air flows from the heat exchanger 120 through the supply duct 132 to the galley compartments 102 and a second position in which at least a portion of the cooled air from the heat exchanger 120 is discharged from the supply duct 132, such as through the vent 142, to the passenger compartment 110 of the aircraft 106. Optionally, the diverter mechanism 134 may include a valve 135, such as a flap valve, that is movable within the supply duct 132 to control the airflow in the supply duct 132. The diverter mechanism 134 may be implemented as any type of mechanism that is capable of regulating airflow through a system.

In the exemplary embodiment, the diverter mechanism 134 is operable in either a fully open configuration, a fully closed position, or any operational position between fully open and fully closed. In the fully open position, the supply duct 132 is left open and un-restricted, and all of the cooled air is supplied to the galley compartments 102. In the fully closed position, the supply duct 132 is closed off or restricted, and all of the cooled air is diverted to the vent 142 to be expelled into the passenger compartment 110. In other positions, the supply duct 132 is only partially restricted and portions of the cooled air is able to be supplied to the passenger compartment 110 while other portions of the cooled air is supplied to the galley compartments 102.

In the illustrated embodiment, the diverter mechanism 134 is implemented as an electrically actuated diverter mechanism that may be controlled by a controller 138. The controller 138 actuates the actuator 136. The diverter mechanism 134 may be opened and closed based on activation conditions determined by the controller 138. For example, the controller 138 may be connected to buttons or an interface that may receive user inputs from an operator. The controller 138 may be operated based on a sensor, such as a temperature sensor 140 in the passenger compartment 110 and/or at least one of the galley compartments 102. The temperature sensor 140 sends inputs to the controller 138, and the controller 138 actuates the actuator 136 based on inputs from the temperature sensor 140. The controller 138 may receive other inputs to control the diverter mechanism 134, such as a door sensor that senses when the door to the aircraft 106 is open (indicating that planning or deplanning is occurring) and that cooling of the passenger compartment 110 is desired.

In other various embodiments, the diverter mechanism 134 may be implemented as a manually actuated diverter mechanism that may be manually actuated. For example, the actuator 136 may be a lever, handle, slider, knob, and the like that may be accessible at an exterior of the galley monument housing 108 and physically moved or otherwise actuated by an operator. The diverter mechanism 134 may be manually actuated by such lever 136 between the open position and the closed position.

In an exemplary embodiment, a shutter 144 is positioned in the vent 142 and/or the supply duct 132 at or near the vent 142. The shutter 144 may be operated to open or close the vent 142 to allow or restrict airflow through the vent 142 to the passenger compartment 110. The shutter 144 may be movable to change the direction of the airflow exiting the vent 142, such as to direct the airflow upward, downward, outward, left, right, toward the windows of the aircraft, toward the aisle of the aircraft, and the like. The shutter 144 controls the flow of the cooled air through the vent 142. The shutter 144 is operably coupled to an actuator 146 that actuates or moves the shutter 144. The shutter 144 is movable between a first position in which the cooled air flows through the vent 142 to the passenger compartment 110 and a second position in which at least a portion of the cooled air from the supply duct 132 is restricted, thus limiting airflow through the vent 142. The shutter 144 may be a sliding-type shutter used to throttle the airflow through the vent. In various other embodiments, the shutter 144 may be a valve. The shutter 144 may be implemented as any type of mechanism that is capable of regulating airflow through the vent 142.

In an exemplary embodiment, the shutter 144 is operable in either a fully open configuration, a fully closed position, or any operational position between fully open and fully closed. In the fully open position, the vent 142 is left open and un-restricted, and all of the cooled air diverted to the vent 142 is supplied to the passenger compartment 110. In the fully closed position, the vent 142 is closed off or restricted, and all of the cooled air diverted to the vent 142 is restricted from flowing through the vent 142, thus limiting airflow to the passenger compartment 110. In other positions, the vent 142 is only partially restricted and a smaller volume of cooled air is supplied to the passenger compartment 110 than in the fully open configuration.

In an exemplary embodiment, the shutter 144 is implemented as an electrically actuated diverter mechanism that may be controlled by the controller 138 or a different dedicated controller. The controller 138 actuates the actuator 146. The shutter 144 may be opened, closed, moved and the like based on activation conditions determined by the controller 138. In other various embodiments, the shutter 144 may be implemented as a manually actuated shutter. For example, the actuator 146 may be a lever, handle, slider, knob, and the like that may be accessible at an exterior of the galley monument housing 108 and physically moved or otherwise actuated by an operator. Optionally, the shutter 144 and the diverter mechanism 134 may be linked and actuated together. For example, the actuators 136, 146 may be mechanically linked such that actuation of one of the actuators causes the other actuator to operate simultaneously.

In other various embodiments, rather than venting directly from the galley monument housing 108, the cooled air may be supplied to many various locations throughout the passenger compartment 110. For example, rather than venting the cooled air from the supply duct through the vent 142, the airflow supply and return system 130 may include a manifold or other structure (not shown) to direct the cooled air to various locations of the passenger compartment 110 (e.g., remote from the galley monument housing 108), such as above one or more rows of passenger seats, to various vents arranged along the ceiling of the passenger compartment, and the like.

The airflow supply and return system 130 includes at least one return duct 152 used to return air to the heat exchanger 120 or other location in the aircraft 106, such as from the passenger compartment 110 and/or the galley compartments 102. In an exemplary embodiment, a single return duct 152 is used to return the air. In other various embodiments, multiple return ducts 152 are used to return the air to the heat exchanger 120 and/or other location, such as one or more return ducts 152 from the passenger compartment 110 and one or more return ducts 152 from the galley compartments 102. In some embodiments, using return air from a cooler compartment, such as from the galley compartments 102, will allow the cooler air to be supplied to the heat exchanger 120, which is able to further cool the air at an even cooler temperature than if the return air is returned from a warmer compartment, such as the passenger compartment 110. Optionally, the airflow supply and return system 130 may variously select which return duct 152 to use to supply the return air to the heat exchanger 120 and/or other location, such as using a system of valves to open or close various return ducts 152. Optionally, the airflow supply and return system 130 may variously select which return duct 152 to use to supply the return air to the heat exchanger 120 and/or other location based on a dew point of the air in the airflow supply and return system 130 and/or the passenger compartment 110, such as to avoid forming condensation.

It should be noted that the various embodiments or portions thereof, such as the controller 138, may be implemented in hardware, software or a combination thereof. The various embodiments and/or components, for example, the controller 138, may be implemented as part of one or more computers or processors. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

The controller 138 may include a plurality of ports to enable displays, input devices, or other user interfaces to connect to the controller 138. Moreover, the controller 138 may include a radio frequency (RF) receiver/transmitter to enable information, such as an input from a user interface, a sensor and the like, to be transmitted from and/or transmitted to the controller 138. The controller 138 may include Random Access Memory (RAM) and Read Only Memory (ROM). The controller 138 may further include a storage device, which may be a hard disk drive or a removable storage drive such as a solid state drive, optical disk drive, and the like. The storage device may also be other similar means for loading computer programs or other instructions into the controller 138. In various other embodiments, the controller 138 may be configured to receive inputs via the Internet using for example, a Wi-Fi connection or a hard-wired connection. Additionally, the controller 138 may be configured to couple to a local area network (LAN) and receive inputs from various devices either installed on the aircraft or located remotely form the aircraft. In further embodiments, the controller 138 may receive inputs from a cellular phone device or any other portable touchscreen device, such as a portable laptop computer, etc.

The controller 138 executes a set of instructions that are stored in one or more storage elements, in order to process input data. The storage elements may also store data or other information as desired or needed. The storage element may be in the form of an information source or a physical memory element within a processing machine. The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

FIG. 6 is a front view of the galley monument 104 and cooling system 100 in accordance with an exemplary embodiment. FIG. 7 is a top view of the galley monument 104 and cooling system 100 in accordance with an exemplary embodiment. The galley monument 104 shown in FIGS. 6 and 7 is configured to be positioned at a bulkhead, and thus the diverted air is unable to be expelled through the back 116 of the galley monument housing 108. As shown in FIGS. 6 and 7, the airflow supply and return system 130 includes secondary supply ducts 162 extending from the supply ducts 132 to the front 114 of the galley monument 104. The vents 142 are positioned at the front 114 and the cooled air is directed forward of the front 114 into the passenger compartment 110. The diverter mechanisms 134 may open or close the secondary ducts 162.

Figure 8:
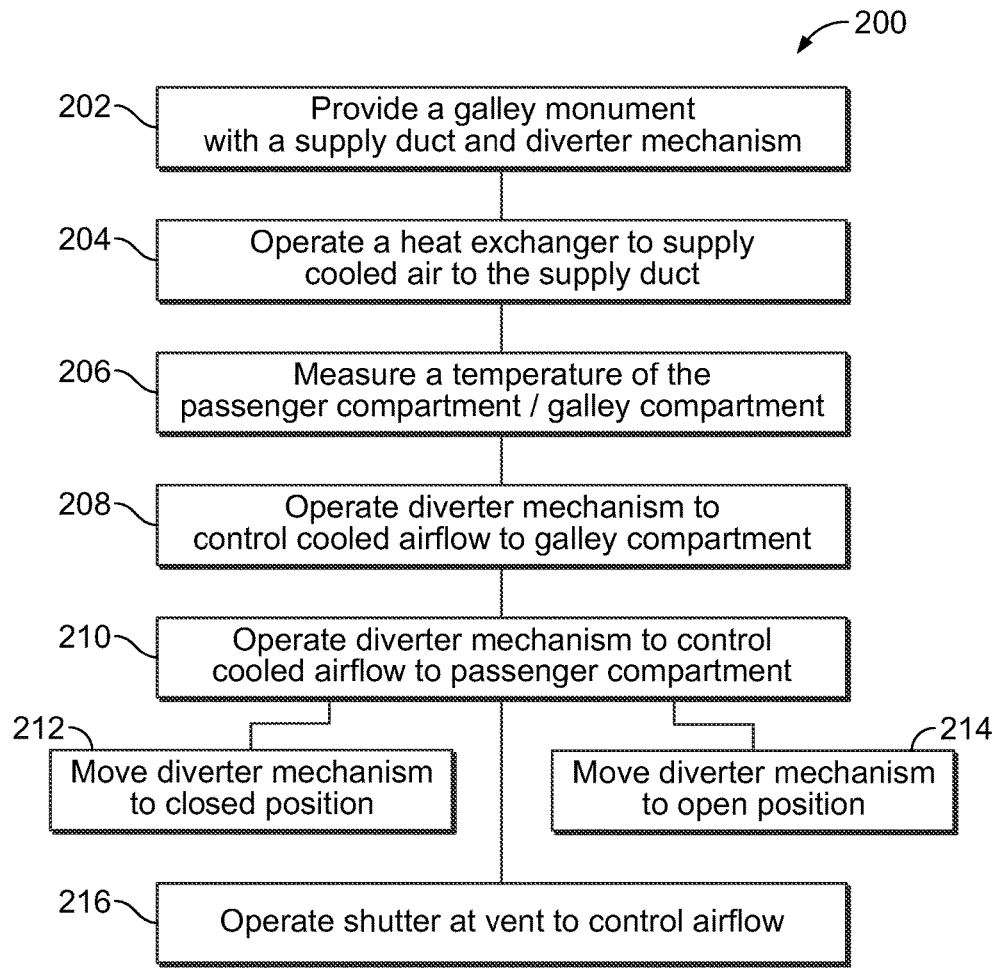
FIG. 8 is a schematic illustration of an exemplary method of cooling a passenger compartment of an aircraft using a galley monument cooling system.

FIG. 8 is a schematic illustration of an exemplary method 200 of cooling a passenger compartment of an aircraft using a galley monument cooling system, such as the cooling system 100 shown in FIG. 1. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware to perform one or more operations described herein.

At 202, various components for supplying cooling airflow to both galley compartments and a passenger compartment of the aircraft are coupled at least partially within a galley monument. For example, a heat exchanger and an airflow supply and return system are at least partially within the galley monument. The airflow supply and return system include a series of ducts to supply and return air from and to the heat exchanger and/or other location. A diverter mechanism is coupled within the galley monument and/or the airflow supply and return system for controlling the airflow in the ducts, and a vent is defined in the galley monument and/or the airflow supply and return system for discharging the cooled air from the ducts to the passenger compartment.

At 204, the heat exchanger is operated to supply cooled air to the supply duct. The heat exchanger may be operated in various modes and at various levels of cooling based on demand for cool air. The heat exchanger may be operated based on user inputs or based on a pre-programmed operation. A fan may be used to control the flow volume or flow rate of airflow through the heat exchanger.

At 206, a temperature sensor may measure a temperature of the galley compartments and/or the passenger compartment. The cooling system may control operation of the heat exchanger based on inputs from the temperature sensor.

At 208, the diverter mechanism is operated in a galley compartment cooling mode. The diverter mechanism is positioned in the supply duct to control the airflow to the galley compartments to supply cooled air to the galley compartments. The diverter mechanism may open certain supply ducts and close of other supply ducts to control the cooled airflow to one or more specific galley compartments.

At 210, the diverter mechanism is operated in a passenger compartment cooling mode. The diverter mechanism is positioned in the supply duct to control the airflow to the passenger compartment to supply cooled air to the passenger compartment. The diverter mechanism diverts at least a portion of the cooled air from the supply duct to discharge the cooled air out of the galley monument into the passenger compartment. For example, at 212, the diverter mechanism is moved from a first or open position in which the cooled air flows from the heat exchanger through the supply duct to the galley compartment(s) to a second position that is an at least partially closed position in which the cooled air from the heat exchanger is discharged from the supply duct to the passenger compartment of the aircraft. The diverter mechanism may be manually actuated, such as by actuating a lever attached to the diverter mechanism. The diverter mechanism may be electrically actuated and may be controlled by a controller. At 214, the diverter mechanism is moved back from the closed position to the open position to again allow the cooled air to flow from the heat exchanger through the supply duct to the galley compartment(s).

At 216, a shutter at the vent is operated to control the airflow from the vent. For example, the shutter may be opened or closed. The shutter may be throttled to restrict part of the airflow from the vent. The shutter may be moved to control the direction of airflow exiting through the vent. The shutter may be manually actuated. The shutter may be electrically actuated and controlled by a controller.

Figure 9:
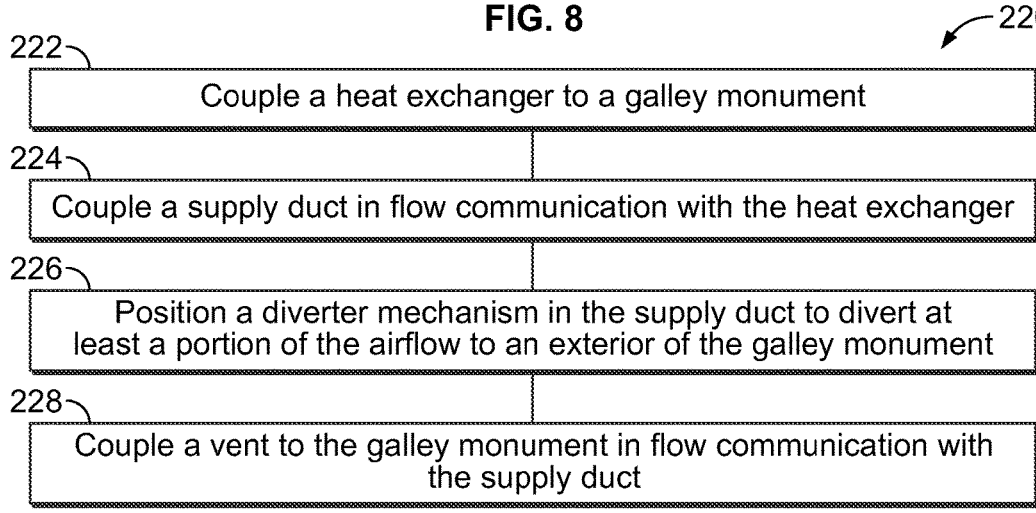
FIG. 9 is a schematic illustration of an exemplary method of manufacturing a galley monument cooling system.

FIG. 9 is a schematic illustration of an exemplary method 220 of manufacturing a galley monument cooling system, such as the cooling system 100 shown in FIG. 1. In various embodiments, the method 220, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 222, a heat exchanger is coupled to a galley monument. The heat exchanger may be coupled to, or housed within, a galley monument housing of the galley monument. The heat exchanger may include at least some components mounted or housed in other areas of the aircraft, such as in the belly of the aircraft, entirely separate from the galley monument. For example, such components outside of the galley monument may be connected to components housed within the galley monument, such as by supply pipes, supply tubes, supply ducts, and the like.

At 224, a supply duct is coupled to a galley monument in flow communication with the heat exchanger. For example, the supply duct may be housed within the galley monument housing. The supply duct may be a series of duct segments that are in flow communication with each other. The supply duct is coupled in flow communication with at least one galley compartment of the galley monument. The supply duct receives cooling airflow from the heat exchanger and delivers the cooling airflow to other portions of the galley monument, such as to the galley compartments.

At 226, a diverter mechanism is positioned in the supply duct to divert at least a portion of the airflow from the supply duct to an exterior of the galley monument. The diverter mechanism may be entirely contained within the supply duct. Alternatively, only a portion of the diverter mechanism may be positioned in the supply duct. The diverter mechanism may be movably positionable within the supply duct to vary an amount of airflow that is diverted. For example, the diverter mechanism may be movable from a fully open position in which all of the airflow in the supply duct is able to flow to the galley compartment(s) to a fully closed position in which none of the airflow in the supply duct is able to flow to the galley compartment(s). In the fully closed position, all of the airflow is diverted to the exterior of the galley monument, such as into the passenger compartment. The diverter mechanism may be variably positionable between the open and closed positions to allow some airflow to the galley compartment(s) and some airflow to the passenger compartment.

At 228, a vent is coupled to the galley monument, such as in the galley monument housing. The vent is positioned in flow communication with the supply duct. The vent allows airflow from the galley monument to the passenger compartment. For example, the diverter mechanism is positioned in flow communication with the vent and airflow diverted by the diverter mechanism to the vent is discharged to an exterior of the galley monument housing, such as to the passenger compartment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A cooling system for use with a galley monument of an aircraft having at least one galley compartment, the cooling system comprising:
    a heat exchanger mounted in proximity to the galley monument of the aircraft and configured to supply cooled air to the at least one galley compartment for cooling galley carts having items for passengers of the aircraft;
    an airflow supply and return system having a supply duct passing through the galley monument, the supply duct coupling the heat exchanger in flow communication with the at least one galley compartment to supply cooled air to the galley carts in the galley compartment of the aircraft; and
    a diverter mechanism positioned at least partially within the supply duct for controlling flow of the cooled air through the airflow supply and return system, the diverter mechanism movable between a first position in which the cooled air flows from the heat exchanger through the supply duct to the at least one galley compartment and a second position in which at least a portion of the cooled air from the heat exchanger is discharged from the supply duct to a passenger compartment of the aircraft.

2. The cooling system of claim 1, further comprising a vent in flow communication with the supply duct, the cooled air being discharged from the supply duct to the passenger compartment through the vent.

3. The cooling system of claim 2, further comprising a shutter configured to control an amount of cooled airflow through the vent.

4. The cooling system of claim 3, wherein the shutter is manually actuated between an open position and a closed position.

5. The cooling system of claim 3, wherein the shutter is electrically actuated between an open position and a closed position.

6. The cooling system of claim 3, wherein the shutter is mechanically linked with the diverter mechanism and actuated between a closed position and an open position as the diverter mechanism is moved between the first and second positions.

7. The cooling system of claim 1, wherein the diverter mechanism is manually actuated between the first and second positions.

8. The cooling system of claim 1, wherein the diverter mechanism is electrically actuated between the first and second positions.

9. The cooling system of claim 8, further comprising a controller operably coupled to an actuator for actuating the diverter mechanism, and further comprising a temperature sensor in at least one of the passenger compartment or the at least one galley compartment, the temperature sensor sending inputs to the controller and the controller actuating the actuator based on inputs from the temperature sensor.

10. The cooling system of claim 1, wherein the diverter mechanism is movable to a third position between the first and second positions in which a portion of the cooled air is able to flow from the heat exchanger to the at least one galley compartment and a portion of the cooled air is able to be discharged to the passenger compartment of the aircraft.

11. The cooling system of claim 1, wherein the galley monument includes a galley monument housing having a top, a front, a back, and a side, the at least one galley compartment configured to received a galley cart through the front, the heat exchanger being positioned at the top, and the airflow supply and return system discharging the cooled air into the passenger compartment near the top.

12. The cooling system of claim 11, wherein the cooled air is discharged from the galley monument housing into the passenger compartment through the back.

13. The cooling system of claim 11, wherein the cooled air is discharged from the galley monument housing into the passenger compartment through the side.

14. The cooling system of claim 11, wherein the supply duct extends generally vertically along the back, the airflow supply and return system having a secondary duct extending to the front and being in flow communication with the supply duct upstream of a diverter valve, when the diverter valve is in the second position, the cooled air is forced from the supply duct, through the secondary duct, and is discharged from the galley monument housing into the passenger compartment through the front.

15. A method of manufacturing a galley monument cooling system for an aircraft, the method comprising:
    coupling a heat exchanger to a galley monument of the aircraft;
    coupling a supply duct to the galley monument of the aircraft in flow communication with the heat exchanger, the supply duct being in flow communication with at least one galley compartment of the galley monument that receives a galley cart having items for passengers of the aircraft;
    positioning a diverter mechanism in the supply duct to divert at least a portion of the airflow from the supply duct to a passenger compartment of the aircraft at an exterior of the galley monument.

16. The method of claim 15, wherein said positioning a diverter mechanism comprises positioning the diverter mechanism within the supply duct such that the diverter mechanism is movable between an open position in which the cooled air is allowed to flow from the heat exchanger through the supply duct to the at least one galley compartment and a closed position in which at least a portion of the cooled air from the heat exchanger is allowed to be discharged from the supply duct to an exterior of the galley monument.

17. The method of claim 15, further comprising coupling a vent in a galley monument housing, the vent being in flow communication with the supply duct, wherein the diverter mechanism is positioned in flow communication with the vent and allows airflow to the vent from the heat exchanger, the vent allowing the airflow to be discharged to an exterior of the galley monument housing.

18. The cooling system of claim 1, wherein the diverter mechanism comprises a flap sized to at least partially restrict airflow through the supply duct and an actuator operably coupled to the flap, the actuator moving the flap between a first position in which the flap allows cooled air to flow through the supply duct to the at least one galley compartment of the galley monument and a second position in which at least a portion of the cooled air is diverted from the supply duct and discharged out of the galley monument into the passenger compartment.

19. The cooling system of claim 18, wherein the flap entirely closes the supply duct to divert substantially all of the cooled air from the supply duct to the passenger compartment.

20. The cooling system of claim 18, wherein the actuator is electrically actuated.

21. The cooling system of claim 18, wherein the actuator is manually actuated by a lever at an exterior of the galley monument.

* * * * *